4 Sheets—Sheet 3.

S. V. ESSICK, J. W. CLAPP & W. G. TILLON.
Knitting-Machine.

No. 217,354. Patented July 8, 1879.

WITNESSES
Franck L. Durand
H. Aubrey Toulmin

INVENTOR
Samuel V. Essick Jno. W. Clapp
Walter G. Tillon
By Alexander &c.
ATTORNEYS

N. PETERS, PHOTO-LITHOGRAPHER, WASHINGTON, D. C.

4 Sheets—Sheet 4.
S. V. ESSICK, J. W. CLAPP & W. G. TILLON.
Knitting-Machine.
No. 217,354. Patented July 8, 1879.
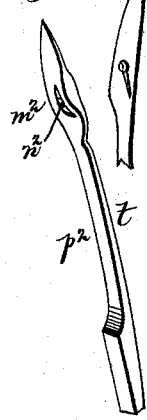
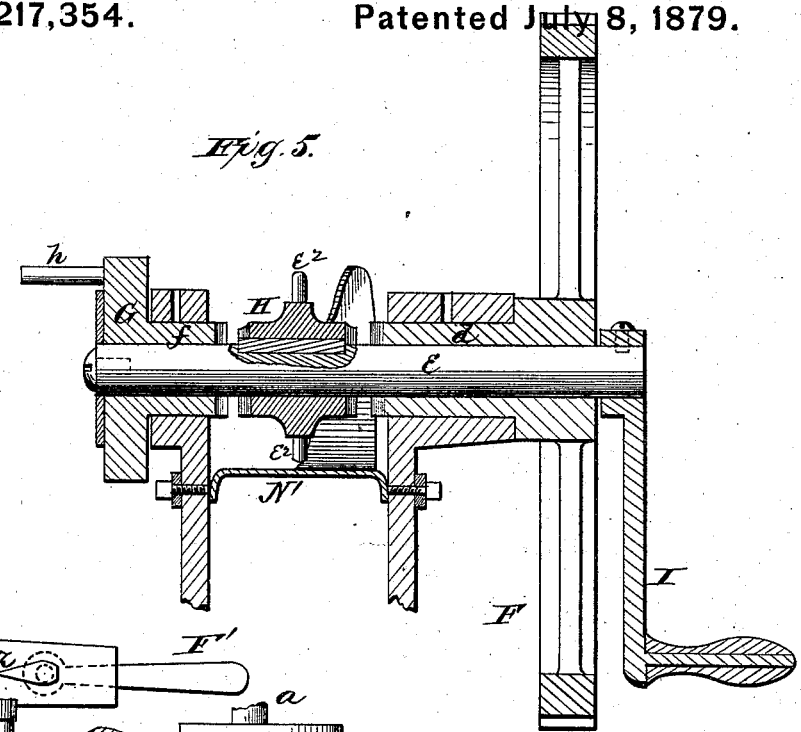
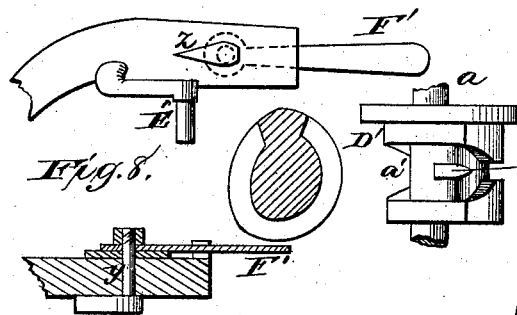
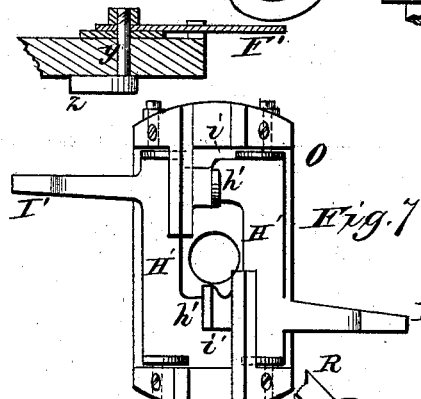
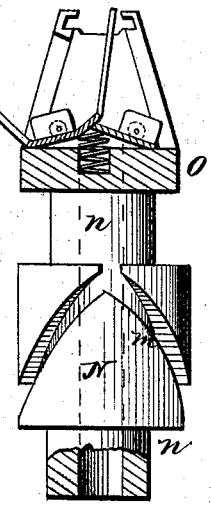
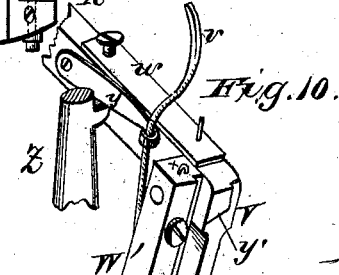
WITNESSES
INVENTOR
Samuel V. Essick, John W. Clapp
Walter G. Tillon
Alexander Mason
ATTORNEYS

UNITED STATES PATENT OFFICE.

SAMUEL V. ESSICK, OF ALLIANCE, OHIO, AND JOHN W. CLAPP AND WALTER G. TILLON, OF NEW HAVEN, CONNECTICUT, ASSIGNORS TO THE HOME KNITTER COMPANY, OF CANTON, OHIO.

IMPROVEMENT IN KNITTING-MACHINES.

Specification forming part of Letters Patent No. 217,354, dated July 8, 1879; application filed March 17, 1879.

*To all whom it may concern:*

Be it known that we, S. V. ESSICK, of Alliance, Ohio, and JOHN W. CLAPP and WALTER G. TILLON, of New Haven, Connecticut, have invented certain new and useful Improvements in Knitting-Machines; and do hereby declare that the following is a full, clear, and exact description thereof, reference being had to the accompanying drawings, and to the letters of reference marked thereon, making a part of this specification.

Our invention relates to that class of knitting-machines for which Letters Patent No. 140,691 were granted to S. V. Essick July 8, 1873; and it consists in the construction and combination of parts, as will be hereinafter more fully set forth, and pointed out in the claims.

In order to enable others skilled in the art to which our invention appertains to make and use the same, we will now proceed to describe its construction and operation, referring to the annexed drawings, in which—

Figure 1:
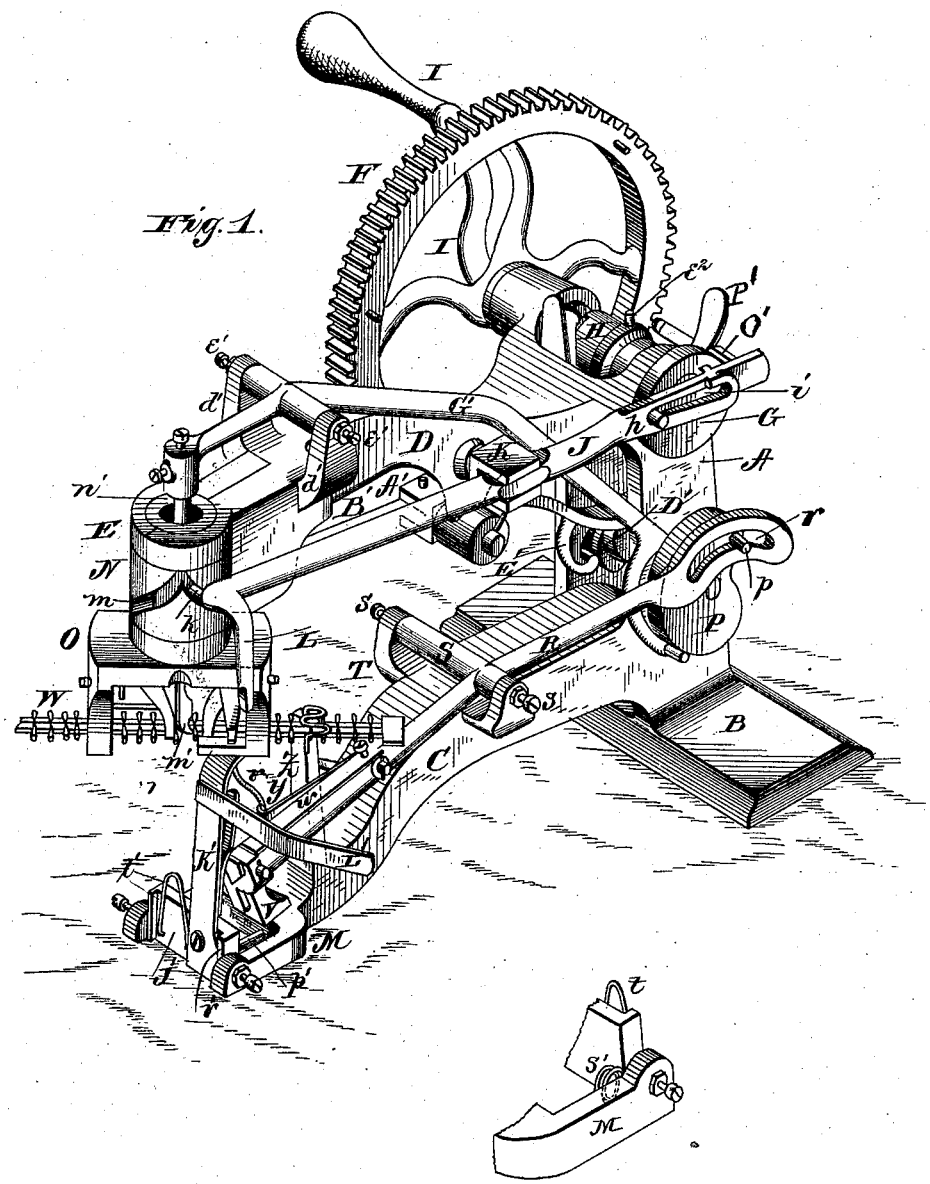
Figure 2:
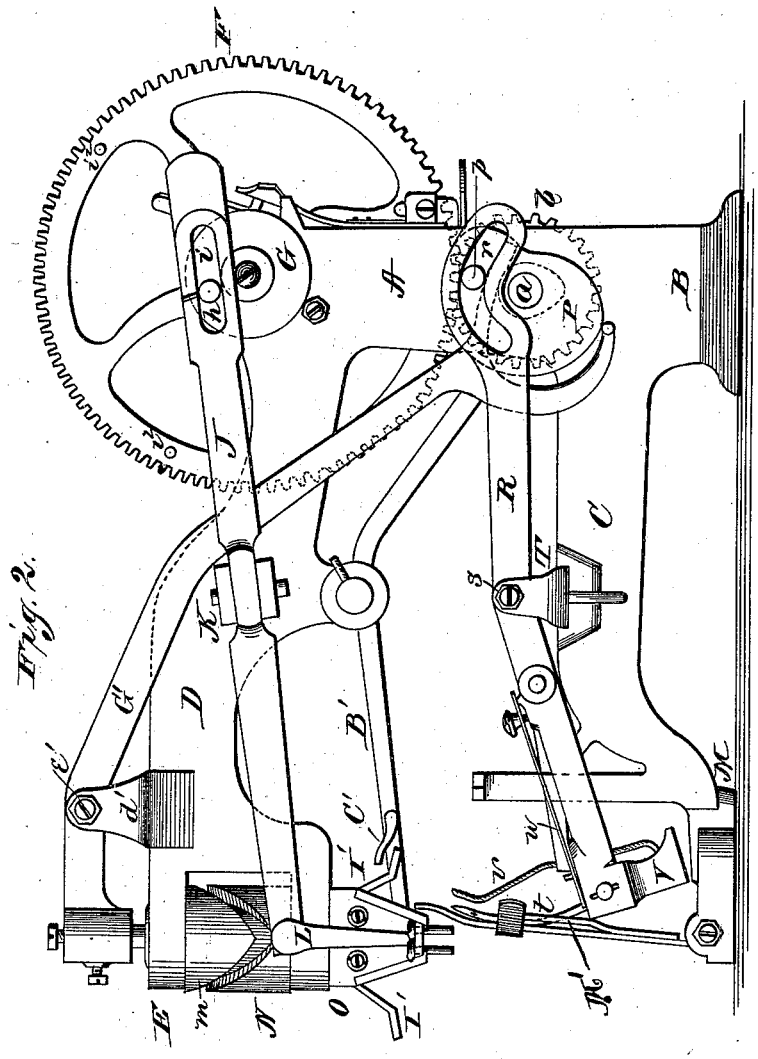
Figure 3:
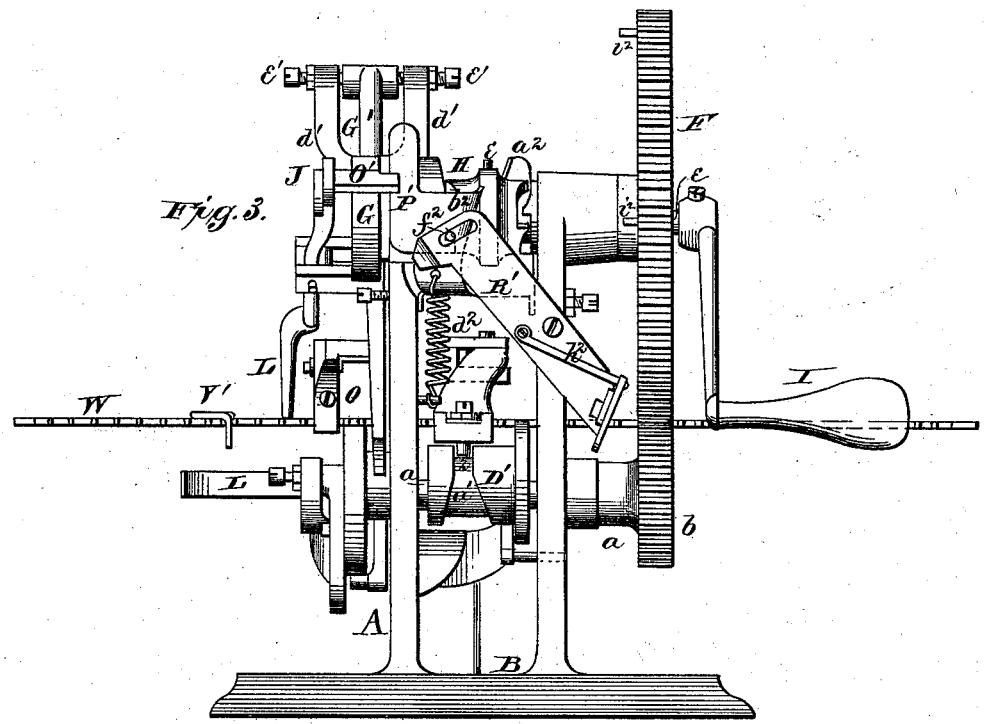
Figure 4:
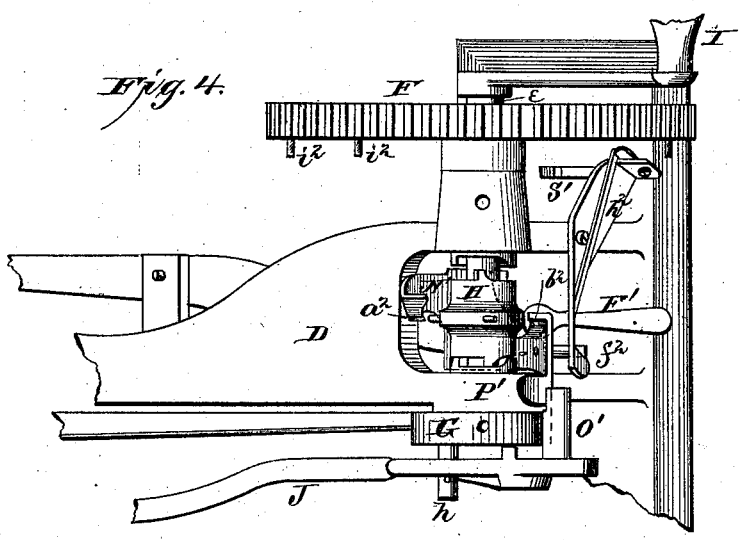

Figure 1 is a perspective view of our improved knitting-machine. Fig. 2 is a side elevation of the same. Fig. 3 is a rear elevation of the machine. Fig. 4 is a plan view of a part thereof. Figs. 5 to 11, inclusive, are detailed views of parts thereof.

A represents a standard, formed with a foot or bed piece, B, and an arm, C, extending at right angles with the foot, as shown, the outer end of said arm being turned downward and forming a second foot, M.

The standard A is formed of two parallel posts or plates, leaving a suitable space between them, and from the upper end of said standard projects an arm, D, which runs above and in the same direction as the lower arm, C. On the outer or front end of the arm D is formed a head, E, as shown. These parts constitute the frame of our machine, and may be all cast in one piece, or otherwise, as desired; but we do not confine ourselves exclusively to this form of frame, as that may be made and arranged in many other ways to answer the same purpose.

Through the standard A, at a suitable distance above the foot B, is passed a shaft, *a*, having upon one end a pinion, *b*. This pinion meshes with a cog-wheel, F, above, said cog-wheel being provided with a hub, *d*, which is inserted in one side of the standard A, and has a shaft, *e*, passing through it. This shaft also passes through a hub, *f*, formed on a disk, G, and inserted from the opposite side into the standard A.

The hubs *d* and *f* are, on their inner ends, formed with clutches, and between them, upon the shaft *e*, is placed a double movable clutch, H, which is moved automatically, by means hereinafter described, laterally on the shaft to engage with either hub, and thus, as the shaft *e* is rotated, to impart a rotary motion either to the cog-wheel F or to the disk G.

The double clutch H is feathered on the shaft *e*, so as to rotate therewith, and the shaft is at one end provided with a crank, I, for operating the entire machine.

On the side of the disk G is a projecting wrist-pin, *h*, which passes into a slot, *i*, in a lever, J, and this lever is pivoted in a clip, K, which is swiveled in the arm D of the frame, the pivot of the lever J and the swivel of the clip K being at right angles to each other.

The front end of the lever J has an arm, L, extending downward from the outer side, and from the inner side projects a pin, *k*, into a cam-groove, *m*, in a roller, N, placed vertically in the head E at the front end of the arm D.

The roller N has at each end a journal, *n*, which passes into the jaws of the head E, and on the lower journal, below the head, is secured a frame or turn-table, O, constructed with a downwardly-projecting arm at each end.

In suitable guides attached to the arms of the frame O is placed a comb, W, consisting of a straight bar with parallel rows of teeth— one row on each side—the teeth being at equal distances apart, and the center of the bar beveled on the upper surface between the teeth.

Upon the opposite end of the shaft *a* from the pinion *b* is secured a double cam, P, and from the outer face of this cam projects a stud or pin, *p*, which projects into a curved slot, *r*, in the rear end of an oscillating or rocking beam or lever, R. This beam or lever is provided with an elongated bearing, S, which is hung upon screws $s\ s$ in upwardly-projecting ears on a bridge, T, formed on the upper side of the arm C. At the outer or front end of the beam R is a downwardly-projecting extension or foot, V, to the side of which is attached a swinging bar, W', and in this bar is fastened the eye-pointed needle $t$. The bar W' also carries the spring $v$, which is grasped by the hooked front end of an arm, Y, pivoted to the side of the beam R, and which arm is stopped during the movement of the beam by offsets on a vertical post, Z, formed on the arm C of the frame, in the same manner and for the same purpose as described in the patent to Essick above referred to.

On top of the rocking beam R is the tension device $w$, and on the top of the swinging bar W' is an eye, $x$, through which the thread passes to the eye in the needle.

In a hub formed on the under side of the upper arm, D, of the frame is swiveled a clip, A', in which is pivoted the feed-bar B'. The front end of this feed-bar is shaped to fit between the teeth of the comb W, and it is provided on its inner side with an L-shaped arm, C'. The rear end of the feed-bar B' rests upon a grooved cam, D', secured on the shaft $a$ between the two posts of the standard A, and an arm, E', projecting from the feed-bar passes under said cam. In the rear end of the feed-bar is a pin, $y$, carrying on its lower end a wedge-shaped switch, $z$, and on its upper end a lever, F', for turning said switch.

In the groove $a^1$ of the cam D' is a V-shaped projection or lug, $b^1$, which turns the feed-lever B' either to the right or left, according as the switch $z$ is turned to one or the other side, thus making the bar B' feed the comb W either to the right or left.

The double cam P above mentioned operates the rear forked end of a beam or lever, G', which is hung on screws $e^1$ in ears $d^1$ on top and near the front end of the arm D of the frame of the machine.

The comb W in the frame O is held so that it cannot move in either direction by means of the arms $k^1\ h^1$, which project from bars H', pivoted in the frame. Each bar H' has an outwardly-projecting lever, I', and also an inwardly-projecting lug, $i^1$, which bears on top of the opposite arm $h^1$.

The arms $h^1$ fit in between two of the teeth of the comb, one on each side, and are so arranged that when pressure is exerted to remove either of them from its place in the comb the other will also move out from the comb, and as soon as the pressure is removed they will both spring into the comb again by the action of one or more springs suitably arranged in connection with one or more of the journals of the bars H', or otherwise.

$m^1\ m^1$ are claws for throwing off the stitches from the teeth of the comb just as the needle ascends to catch them. These claws are formed on the lower end of a vertical shaft, $n^1$, which passes centrally through an enlarged bore in the frame O and cam-roller N, and the upper end of said shaft secured by a set-screw in a hub formed on the forward end of the beam G'.

The foot M of the frame of the machine is forked, and in the same is hung a plate, J', having a pin, $p^1$, and spring $s'$, the spring being so arranged as to hold the pin away from a shoulder in the foot. The plate can be rocked until the pin strikes said shoulder; but when the pressure is removed the spring returns the plate into position.

On the front of the plate J' is pivoted an arm K', which is by a spring, $t'$, held against a shoulder, $v'$, on the plate. The arm K' extends upward, and has its upper end curved rearward under the comb, and from near its upper end projects a curved side spring-arm, L'.

On the back of the arm K' is attached a separate bar, M', having an inclined edge, $x'$, to come in contact with an inclined shoulder, $y'$, on the front end of the beam R.

Under the double clutch H on the shaft $e$ is, in suitable trunnions, hung a plate, N', which is turned to form an incline, $a^2$, on the inner side of the clutch, and another incline, $b^2$, on the other side thereof. A spring, $d^2$, is connected to the plate N' in such a manner as to throw the incline $b^2$ away from the clutch and the incline $a^2$ close to it, so that radial pins $e^2$, projecting from said clutch, will strike said incline and move the clutch in gear with the hub $f$.

On the rear end of the lever J is an arm, O', which projects inward against an arm, P', projecting from the plate N', and turns the said plate so that the incline $a^2$ will be thrown away from and the incline $b^2$ thrown toward the clutch, and the radial pins $e^2$ then striking against said incline $b^2$ will cause the clutch to move over and engage with the hub $d$.

On the outer turned-up portion of the plate N' is a pin, $f^2$, which projects through an inclined slot in a plate, R', pivoted to the back of the standard A. The lower end of the plate R' has a hook, S', pivoted thereto, said hook being held in proper position by a spring, $h^2$, and is intended to engage with pins $i^2$ projecting from the inner side of the cog-wheel F.

V' are stops on the comb W. These stops are made of spring-wire, forming two legs, to embrace the comb, where they are held by the natural spring of the wire, and can yet be easily removed and changed when required.

The main operation of this machine is substantially the same as that of the machine described in patent to S. V. Essick, and upon which this invention is an improvement; hence it is not necessary to describe the same, except in so far as relates to the improvements made by us.

As to the feed-bar B', this bar having moved the comb W the distance of one tooth rises above the comb at its front end, and then moves inward the distance of one tooth until it is in position to pass down again, the arm C' of the feed-bar being then directly over the lever I'. The feed-bar remains in this position while the needle ascends, and about the same time as the needle commences to descend the front end of the feed-bar also descends, the arm C' pressing down the lever I', which throws the arms $h^1$ away from the comb. As soon as the needle has cleared the comb, and while it is completing its downward movement, the front end of the feed-bar takes hold of the comb and is then turned outward, carrying the comb with it the proper distance, when the feed-bar rises as before, the arm C' having cleared the lever I' the arms $h^1$ spring inward again into the comb and hold the same stationary.

The arms K' L' operate in the following manner: When the needle is down the upper curved end of the arm K' is below and inward from the comb. As the needle ascends the end of the beam R presses against the bar M', which causes the plate J' to turn on its pivot sufficiently to cause the upper curved end of the arm K' to press three or more of the stitches next to the one being thrown off by the claws close to the center of the comb and hold them on the comb. Just as the needle completes its upward stroke the upper end of the bar M' is cleared by the shoulder $y'$ on the end of the beam R, and the spring $s'$ throws the plate J' inward again. As the beam R with the needle then descends, the shoulder $y'$ on the beam works against the incline $x'$ on the bar M' and throws the arms K' L' to one side, so as not to interfere with the web while the comb is being fed. The spring $t'$ returns the arms K' L' to their former position. These arms hold the web away from the beam R and the mechanism connected thereto. The double cam P gives the beam G' the necessary rocking movement to cause the claws $m^1$ to throw off the loop and hold it for the needle to pass through.

The stops V' are used in the comb when knitting tubular work. As the knitting progresses along one side of the comb and the comb has been fed to the right as far as required, the stop at the left comes in contact with the arm L of the beam J and presses the same slightly inward. The beam or lever J then turns on its pivot sufficiently far to cause its rear arm, O', to clear the arm P' of the rocking plate N', when the spring $d^2$ at once turns said plate to bring the inner incline, $a^2$, in contact with the pins $e^2$ of the double clutch H. This double clutch then moves laterally, so as to engage with the hub $f$ when the disk G is rotated by the clutch. The pin $h$ on said disk working in the slot $i$ of the lever J causes said lever to turn on its swivel K, and the pin $k$ at the front end of said lever then working in the cam-groove $m$ on the roller N gives said roller a one-half revolution while the disk G completes one revolution. This reverses the position of the comb W, and as the disk G completes its revolution the arm O' of the lever J comes up behind the arm P' of the plate N' and turns said plate so that the incline $b^2$ will come in play and move the double clutch back to position to engage with the hub $d$ and rotate the cog-wheel F, and through it the knitting and feeding mechanisms.

When the plate N' is turned by its spring $d^2$, as above described, the pin $f^2$ turns the plate R' so that the hook S' on its lower end will be close to the side of the cog-wheel F, and one of the pins $i^2$ on said wheel will enter and engage with said hook, whereby said wheel F and the entire knitting and feeding mechanisms become locked and cannot be moved. The plate N' is again turned by the arms O' P', which throws the hook S' away from the wheel.

The needle $t$ is formed with a bulge at $m^2$ to give surface to the eye $n^2$, so that it will throw the yarn forward to cause the yarn or new loop to hang as far to the right side of the tooth as possible, so that the loop will be sure to go on the tooth. The eye $n^2$ passes through the bulge $m^2$ in an oblique direction.

The needle is further provided with a notch or recess, $p^2$, which allows the needle to get out of the way of the shield, and also to hook off the old stitch. It further allows the old stitch to aid in placing the new one in such position as to be sure to go on the tooth.

Having thus fully described our invention, what we claim as new, and desire to secure by Letters Patent, is—

1. In a knitting-machine having a rotating frame or holder carrying a double comb, an automatic locking device, in combination with the knitting and feeding mechanisms, for locking said mechanisms while the comb is being reversed, substantially as herein set forth.

2. In a knitting-machine having a rotating frame or holder carrying a double comb, the combination of a continuously-rotating shaft, having at one end devices for operating the knitting and feeding mechanisms, and at the other end devices for rotating the holder, and a double clutch and mechanism for automatically moving the same on the shaft for engaging said clutch with one or the other of said devices, substantially as herein set forth.

3. The feed-bar B', provided with the arms C' and E', and pivoted in a swiveled clip, A', in combination with the grooved cam D', the comb W, the plate H', having the lever I', and the arm $h^1$, substantially as and for the purposes herein set forth.

4. The combination, with the foot M, of the arms K' L', plate J', springs $s'$ $t'$, bar M', with incline $x'$, and the needle-beam R, and means for operating the same, with shoulder $y'$, all substantially as and for the purposes herein set forth.

5. The combination of the double cam P, rocking beam G', and the shaft $n^1$ with claws $m^1$ and the comb and the comb-holder O, for the purposes herein set forth.

6. The combination of the lever J, pivoted in the swivel K, and provided with the arm L and pin $k$, the roller N, provided with cam-groove $m$, and the disk G, provided with pin $h$, projecting through a slot, $i$, in the end of the lever, for the purposes herein set forth.

7. The combination of the double clutch H, having radial pins $e^2$, the rocking plate N', provided with inclines $a^2$ $b^2$, and the spring $d^2$, substantially as and for the purposes herein set forth.

8. The combination of the lever J, with arm O', and the rocking plate N', with arm P', as and for the purposes herein set forth.

9. The combination of the rocking plate N', with pin $f^2$, the pivoted plate R', having inclined slot, the hook S', spring $h^2$, and the wheel F, provided with the pin $i^2$, substantially as and for the purposes herein set forth.

10. An eye-pointed needle having a notch or recess, $p^2$, and a bulge, $m^2$, through which the eye $n^2$ passes in an oblique direction, substantially as and for the purposes herein set forth.

In testimony that we claim the foregoing we have hereunto set our hands.

SAMUEL V. ESSICK.
JOHN W. CLAPP.
WALTER G. TILLON.

Witnesses:
FRANK L. DEPEW,
A. C. WETMORE.